United States Patent
Trajmar et al.

(10) Patent No.: US 8,098,737 B1
(45) Date of Patent: Jan. 17, 2012

(54) ROBUST MULTI-TUNER/MULTI-CHANNEL AUDIO/VIDEO RENDERING ON A SINGLE-CHIP HIGH-DEFINITION DIGITAL MULTIMEDIA RECEIVER

(75) Inventors: Peter Trajmar, San Jose, CA (US); Nishit Kumar, San Jose, CA (US); Gerard Yeh, Redwood City, CA (US)

(73) Assignee: Zoran Corporation, Sunnyvale, CA (US)

( * ) Notice: Subject to any disclaimer, the term of this patent is extended or adjusted under 35 U.S.C. 154(b) by 981 days.

(21) Appl. No.: 10/879,819

(22) Filed: Jun. 28, 2004

Related U.S. Application Data

(60) Provisional application No. 60/483,164, filed on Jun. 27, 2003.

(51) Int. Cl.
*H04L 25/34* (2006.01)
*H04L 25/49* (2006.01)
*H04N 7/12* (2006.01)
*H04N 11/02* (2006.01)
*H04N 11/04* (2006.01)

(52) U.S. Cl. .................. 375/240.25; 375/229; 375/293; 375/294

(58) Field of Classification Search .................. 375/229; 370/249, 304
See application file for complete search history.

(56) References Cited

U.S. PATENT DOCUMENTS

| | | | | |
|---|---|---|---|---|
| 5,812,976 | A * | 9/1998 | Ryan | 704/201 |
| 5,874,995 | A * | 2/1999 | Naimpally et al. | 375/240.25 |
| 5,950,115 | A * | 9/1999 | Momtaz et al. | 455/73 |
| 6,018,273 | A * | 1/2000 | Tsyrganovich | 331/2 |
| 6,118,486 | A * | 9/2000 | Reitmeier | 348/441 |
| 6,175,385 | B1 * | 1/2001 | Kohiyama et al. | 348/537 |
| 6,614,319 | B2 * | 9/2003 | Saeki et al. | 331/17 |
| 6,917,652 | B2 * | 7/2005 | Lyu | 375/240.25 |
| 7,088,398 | B1 * | 8/2006 | Wolf et al. | 348/423.1 |
| RE39,345 | E * | 10/2006 | Katto | 375/240.28 |
| 2003/0016753 | A1* | 1/2003 | Kim et al. | 375/240.21 |
| 2004/0080671 | A1* | 4/2004 | Siemens et al. | 348/473 |
| 2004/0196920 | A1* | 10/2004 | Loheit et al. | 375/281 |
| 2005/0249212 | A1* | 11/2005 | Schoner | 370/389 |

* cited by examiner

*Primary Examiner* — Jayanti K Patel
*Assistant Examiner* — Jessica Prince
(74) *Attorney, Agent, or Firm* — Dickstein Shapiro LLP

(57) ABSTRACT

A method and apparatus for providing a single-chip digital multimedia receiver for multi-channel/multi-tuner rendering comprising receiving multiple independently encoded input streams on a system-on-a-chip, and independently locking each video output to a corresponding input channel, to ensure that each video and audio output has a clock matched to an encoder clock.

17 Claims, 4 Drawing Sheets

ROBUST MULTI-TUNER/MULTI-CHANNEL AUDIO/VIDEO RENDERING ON A SINGLE-CHIP HIGH-DEFINITION DIGITAL MULTIMEDIA RECEIVER

REFERENCE TO RELATED APPLICATIONS

The present invention is related to, and claims the benefit of U.S. Provisional Patent Application No. 60/483,164, filed on Jun. 27, 2003. That application is incorporated in its entirety herein by reference.

FIELD OF THE INVENTION

The present invention relates to digital receivers, and more specifically to multi-channel rendering on a high-definition digital receiver.

BACKGROUND

In any broadcast video system it is important that the video being displayed by the television receiver (decoder) is accepted and processed at the same rate as that of the broadcast side (encoder). This rate synchronization is attained by use of encoder-side timestamps that are transmitted in a transport stream as a special clock-reference packet. For example, the PCR (Program Clock Reference) packet in MPEG contains a 42-bit counter based on a 27 MHz reference clock in the encoder. In MPEG transmissions, PCR packets arrive no more than 100 milliseconds apart.

On the decoder side, the arrival of each PCR packet is recorded with the System Time Clock (STC). The System Time Clock is based on a 27 MHz reference clock local to the receiver. A basic synchronization system consists typically of a first order feedback loop. Each incoming PCR value is subtracted from the corresponding decoder's STC value, and the filtered difference (times a proportionality constant) is the control voltage for the voltage controlled crystal oscillator (VCXO) that supplies the reference clock to the decoder/display chip. This feedback loop stabilizes with the correct frequency, ensuring a lock between the encoder and the decoder reference clocks.

As these video receiver systems are becoming more-and-more sophisticated, the requirement to handle multiple high-definition channels simultaneously is getting more prominent. Such a situation could arise either in systems with multiple tuners or in systems required to process multiple channels within the same transport stream from a single tuner. The additional channels may be used for Picture-In-Picture (PIP) display, viewing one channel while recording other channels, or driving multiple independent displays.

In a system that simultaneously handles two channels, for example, with independent rates, locking the audio/video rendering clock for both channels to one input channel can result in the need to drop frames or replicate frames due to the varying input rates of the two channels. Additionally, if there are time-base errors in the input channel used for locking, both channel outputs will be impacted.

SUMMARY OF THE INVENTION

A method and apparatus for a multi-channel receiver is described comprising receiving multiple independently encoded input streams on a system-on-a-chip, and independently locking each video output to a corresponding input channel, to ensure that each video output has a clock matched to an encoder clock.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for robust multi-tuner/multi-channel audio/video rendering on a single-chip high-definition digital multimedia receiver is described. The problems of locking multiple independent channels to a single input time base can be overcome by independently locking each audio/video output to the corresponding input channel. The method and system to do so are described herein.

In advanced digital multimedia receivers (for example set-top boxes or digital televisions) it is desirable to support multiple tuners, such that each tuner receives compressed audio/video transport streams from independent transmitters or broadcast media. As an example, a digital set-top box may support reception of signals from a combination of terrestrial broadcast signals, digital cable, or satellite, simultaneously. Additionally, a transport stream from a single tuner may contain multiple channels, and digital multimedia receivers may process them simultaneously for advanced television features.

Since an encoder for a particular channel on the transmitter side embeds its own clock information within the stream, the decoder on the digital multimedia receiver side must recover the encoder's clock. This clock is used by audio and video rendering modules so that, for example, the intended display rate from the encoder is precisely maintained by the decoder. Without clock recovery the decoder's display rate may drift over time and may cause repeated or dropped video frames.

Figure 1:
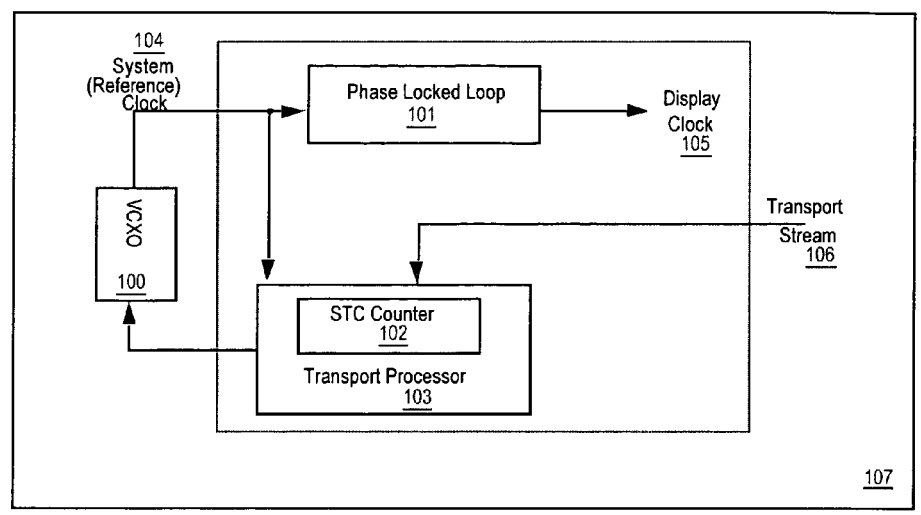
FIG. 1 is a block diagram of one embodiment of the Encoder/Decoder Rate Synchronizer Loop.

FIG. 1 shows an embodiment of an encoder/decoder rate synchronization loop 107 for a single channel. It includes a Transport Processor 103, a voltage controlled oscillator (VCXO) 100, and a phase locked loop (PLL) 101. In one embodiment, the PLL 101 and the Transport Processor 103 are integrated into a single-chip high-definition digital multimedia receiver system. The Transport Processor 103 includes a counter 102 based on the System Time Clock (STC) 104, shown as System (Reference) Clock in FIG. 1. The Transport Processor 103 receives a transport stream 106 including a number of program clock reference (PCR) packets. The arrival-time of each PCR packet is recorded with the value of the STC counter 102 at that time. In one embodiment, the STC Counter 102 is based on a 27 MHz reference clock local to the receiver. Each incoming PCR value is subtracted from the decoder's corresponding STC Counter value, and the product of the filtered difference multiplied by a proportionality constant is used as the VCXO control signal for the external VCXO 100. This feedback loop stabilizes with the correct frequency, ensuring a lock between the encoder and the decoder reference clocks.

One output of the PLL 101 is the display clock 105 that is supplied to the display rendering module. In one embodiment, other clocks required by the system-on-a-chip (SOC) are also generated by the PLL, for example, memory interface clock, clock for the integrated central processing unit (CPU), audio clock, and core clock. The display clock and audio clock must precisely track the STC in order to maintain precise display and audio rendering rates, that is, without skipped or repeated frames. Other clocks in the system, such as memory interface clock, need not track the STC precisely. They simply need to be fast enough to be able to support the throughput requirements of the application being run on the receiver system.

The present invention describes methods and hardware implementations to solve this problem in multiple tuner and/or multiple channel situations. The method and system described renders multiple audio and video streams precisely without repeating frames, dropping frames, or cross-corrupting the time bases. The same method and system can be employed to render multiple video channels on the same display device in a Picture-and-Picture application. In this case the video display-rate is locked to the rate of the channel being heard. There may be dropped or repeated frames for channels other than the one used for locking.

Dual Tuner/Dual Channel Multimedia Receiver System

Figure 2:
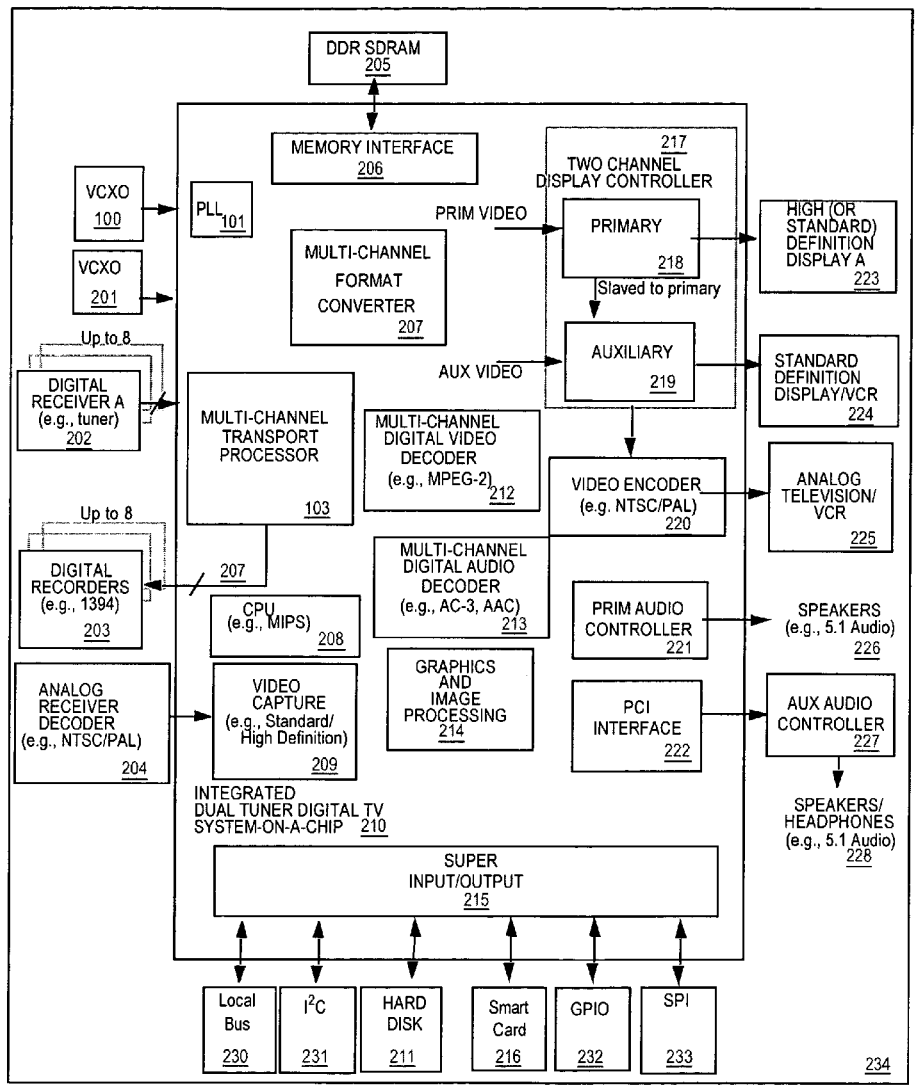
FIG. 2 is a block diagram of one embodiment of a Dual Tuner Digital Multimedia Receiver System-on-a-Chip.

FIG. 2 illustrates block diagram of one embodiment of a digital receiver system in which one embodiment of the invention can be practiced. Such a receiver system 234 can be used to build integrated digital high definition televisions (HDTV), standard definition televisions (SDTV), set-top boxes, and personal video recorders. At the heart of the receiver system 234 is a highly integrated system-on-a-chip (SOC) 210 which contains the ability to support dual/multiple decode, display, and time bases, the architecture of which is the subject of this invention.

The digital multimedia receiver system 234, in one embodiment, includes two or more VCXOs 100, 201 (voltage controlled oscillators), which generate the channel reference clocks for the SOC 210. The receiver system 234 further includes one or more Digital Tuners 202 that feed compressed audio/video data stream into SOC 210. In one embodiment up to eight digital tuners could be coupled with the SOC 210. The digital multimedia receiver system 234 may further include one or more Digital Recorders 203 that store compressed audio/video data stream from the SOC 210. In one embodiment up to eight digital recorders could be coupled with the SOC 210. The receiver system 234 may also contain Analog Receiver and Decoder 204 that feeds uncompressed video programs into the SOC 210.

The system 234, in one embodiment, further includes External Memory 205 to store temporary variables and data used by SOC as well as rest of the components in the system. The system 234, in one embodiment, further includes Hard-Disk 211 (to store audio/video content particularly for PVR functionalities). The system 234 may further include a Smart Card 216 (to provide conditional access keys), Local bus interface 230 (to connect a flash or EEPROM device, for example, for system boot-up), GPIOs 232 (general-purpose input-output), I²C interface (for additional peripheral input output functions), and SPI interface 233 (for internet connection). The SOC 210, in one embodiment, further includes a Video Encoder 220 that receives uncompressed video and creates the relevant format for conventional TVs and VCRs, and High or Standard Definition Display Controllers 223, 224, to output the video to the appropriate display device.

Real-life digital video systems may contain fewer or more components around the SOC 210 than what is shown in FIG. 2, depending on the functionalities supported by that system.

In one embodiment, the system-on-a-chip 210 is a high-performance processor that performs a variety of audio/video (A/V) processing and storage functions required for a number of applications including digital set-top boxes, digital TVs, high definition TVs, and personal video recorders.

Figure 4:
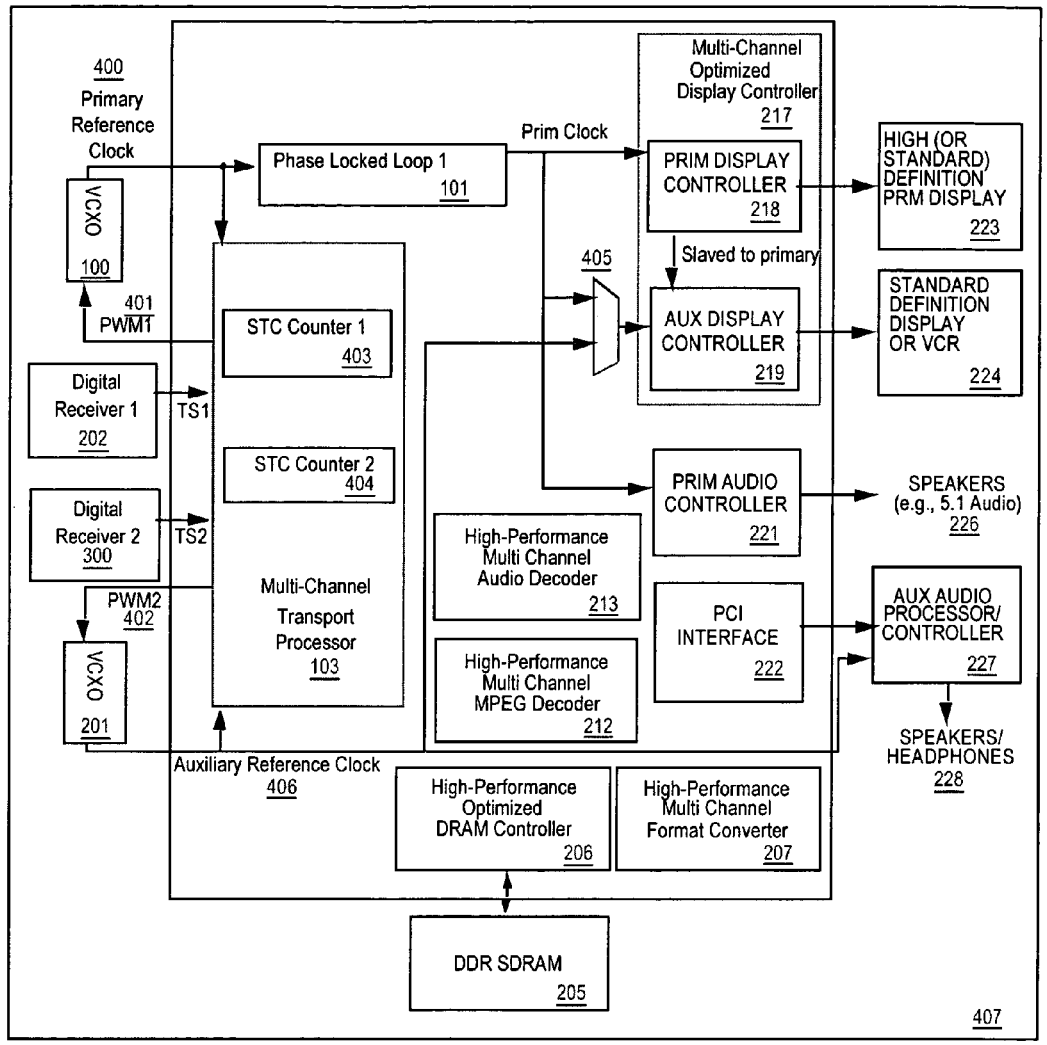
FIG. 4 is a block diagram of on embodiment of components for Support of Dual Tuner within a Digital Multimedia Receiver system on a chip.

The SOC 210 includes a Transport Processor 103, which accepts multiple transport streams as input, and performs filtering, descrambling, and demultiplexing functions on multiple streams. The demultiplexed outputs of the Transport Processor 103 are written to various buffers in the external memory 205. In one embodiment, the Transport Processor 103 contains single instances of a Packet ID (PID) Filter circuit, a high-performance descrambler (supporting a number of descrambling standards) and a general-purpose microcontroller 208 implementing application-specific (multi-standard) demultiplexing functions in firmware. In one embodiment, each of these high-performance processing units supports up to four transport streams, simultaneously. In one embodiment, the Transport Processor 103 contains two sets of clock recovery circuitry, STC Counter 1 403 and STC Counter 2 404, each of which can perform its function on any of the four streams being demultiplexed by the transport demultiplexer, and subsequently decoded and displayed. This is illustrated in FIG. 4.

The primary PLL 101 takes in the clock from an external VCXO 100, 201 and generates the clocks used within the SOC 210, e.g., memory clock, CPU clock, display clock, and core clock. As will be discussed later, the frequency of the input clock is fine-tuned by one of the incoming transport streams in the Transport Processor 103, so that the audio/video rendering modules within the SOC 210 run at exactly the same frequency as the encoder used to compress the audio/video data. In one embodiment, the clock information is embedded within the transport stream in special PCR packets.

A second VCXO 201 is used, in one embodiment, for the output sections of the Auxiliary Display Controller 219 and Auxiliary Audio Controller 227 or Processor 227 and is fine-tuned by the second clock recovery circuit in the Transport Processor 103. In other embodiments, the VXCOs 100, 201 generate an additional separate clock for audio. In that instance, in one embodiment, the audio clock is locked to the reference clock.

In one embodiment, video decompression is performed by the Multi-Channel Digital Video Decoder 212. The Decoder 212 reads its input from and writes its output to Memory 205 through Memory Interface 206. In one embodiment, the Decoder 212 need not be tightly locked to the input or output rates, but provides sufficient processing bandwidth to handle multiple frames of video in the time it takes to display one frame. In one embodiment, the Digital Video Decoder 212 has sufficient processing bandwidth to decode two high-definition frames, six standard-definition frames, or a combination of these, in the time it takes to display one frame. The decoding bandwidth of Decoder 212 is determined by the clock rate applied to it as well as the bandwidth of the memory subsystem 205, 206.

The Multi-Channel Format Converter 207 reads video frames of data from memory 205 and converts them to the display format before writing the frames back out to memory 205. In one embodiment, the conversion includes one or more of the following: video scaling to fit the screen resolution, de-interlacing, and color density conversion (i.e. 4:2:0 to 4:2:2, etc.). In one embodiment, the Multi-Channel Format Converter 207 is not tightly coupled to any of the time-base oscillators and has sufficient processing bandwidth to keep up with the maximum performance of the Digital Video Decoder 212.

The Two Channel Display Controller 217 includes a Primary Display Controller 218 and an Auxiliary Display Controller 219. The primary Display Controller 218 composes several graphics sources (background graphics, scaled graphics windows, and cursor) and video sources (full screen video, scaled video windows) into a final video output. In one embodiment, Primary Display Controller 218 provides circuitry for converting the uncompressed video produced by the Digital Decoder 212 or the Multi-Channel Format Converter 207 into a number of possible display formats (e.g., interlaced, progressive, 16×9 display, 4×3 display, etc.).

The support for scaled video windows allows for two or more channels to be combined into a single display, commonly known as "picture in picture." Picture and picture (multiple channels of video displayed side by side) is also supported. In one embodiment, the display is locked to the time base of the tuner from which audio is being played. Video from the other channel or tuner may have skipped or repeated frames.

An Auxiliary Display Controller 219 serves a similar role for the second channel. In one embodiment, Auxiliary Display Controller 219 has reduced capabilities, such as supporting only standard-definition (not high-definition), no cursor, no scaled video, etc. In one embodiment when displaying a channel from one tuner on the Primary Display 223 and another tuner on the Auxiliary Display 224, the Auxiliary Display Controller 219 output section will be clocked by the auxiliary video clock.

The Auxiliary Display Controller 219 may either fetch the second video channel independently from memory 205 for the display of an independent channel, or be slaved to the Primary Display Controller 218 when the same channel is to be output from both the Primary 218 and Auxiliary Video 219 outputs. If the Auxiliary Display Controller 219 is slaved to the Primary Display Controller 218, the memory bandwidth requirement is reduced since both Display Controllers 218, 219 share the data for video channel fetched from memory by the Primary Display Controller 218. This is useful, for example, for recording the channel being displayed on the Primary Display 223 to a VCR 224 via the Auxiliary Display Controller 219. In this case, the Auxiliary Display Controller 219 output section is clocked by the primary video clock.

In one embodiment, audio decompression is performed by a general-purpose DSP microcontroller implemented within the Multi-Channel Digital Audio Decoder 213. Due to its general purpose nature, the Digital Audio Decoder 213 is capable of supporting a wide variety of digital audio decoding techniques and standards. The Audio Decoder 213 reads its input and writes its output to Memory 205. In one embodiment, the Audio Decoder 213 need not be tightly locked to the input or output rates, but rather provides sufficient processing bandwidth to handle the necessary audio decoding in real time.

In one embodiment, the Digital Audio Decoder 213 has sufficient processing bandwidth to decode either one AAC stream, or two AC-3 streams. The decoding bandwidth of the Digital Audio Decoder 213 is determined by the clock rate applied to it, as well as the bandwidth of the memory subsystem 205, 206. The primary Audio Controller 221 reads the audio data for the primary channel from Memory 205, formats the data, and streams out audio frames. In one embodiment, the output section of the Primary Audio Controller 221 is driven by a clock derived by the PLL 101 driven by the VCXO 100 locked to the primary transport input channel. The Primary Audio Controller 221 also supports a number of special effects, such as, audio cross fade and mixing.

Due to the varying computation requirements of AC-3 and AAC, in one embodiment different approaches are taken for each standard. In the case of two channels of AAC audio, in one embodiment, the Digital Audio Decoder 213 does not have sufficient computational bandwidth to decode compressed audio streams for both channels. In that instance, the Digital Audio Decoder 213 is used to decode one of the compressed audio streams, which is then output from the Audio Controller 221.

In this embodiment, an additional Digital Audio Decoder and Controller 227 chip is added to the system as an external component that receives the compressed audio data via DMA through the PCI Interface 222. In an alternate embodiment, the additional Digital Audio Decoder and Controller 227 could be incorporated into the SOC 210. In one embodiment, the external Audio Controller 227 is slaved to the auxiliary channel VCXO 201.

In another embodiment, in which there are two channels of AC-3 audio, the Digital Audio Decoder 213 has sufficient computational bandwidth to decode compressed audio streams for both channels. The first channel is output via the Audio Controller 221 and the uncompressed audio data is transferred via DMA out on the PCI Interface 222 to an external audio controller chip 227. The external Audio Controller 227 is, in one embodiment, slaved to the auxiliary channel VCXO 201.

The Memory Controller 206 services read/write requests from all the internal modules connected via an internal bus. In one embodiment, the Memory Controller 206 interfaces with a memory 205 external to the SOC 210. DDR SDRAM 205 is used in one embodiment, however this approach can be used for any type of external DRAM (conventional DRAM, SDRAM, DDR SDRAM, RDRAM, etc.). In one embodiment, the Memory Controller 206 is highly optimized to service the requirements of a mix of clients, some requiring low latency (i.e., the CPU), and others high bandwidth (i.e. Digital Video Decoder). The Memory Controller 206 is also carefully designed for maximum utilization of the external DRAM 205.

In one embodiment, the Graphics and Image Processing unit 214 provides additional scaling and blending functions for video and graphics objects. The on-chip integrated CPU 208 is used not only to control all the modules within the SOC 210, but in one embodiment also to execute the software stack required to make the DTV system work together. In one embodiment, the SOC 210 also has a Video Capture unit 209 that provides another source of video content. Video Capture unit 209 is used to capture uncompressed video data.

The Super Input/Output unit 215 provides peripheral functions for the SOC 210 which may include one or more of: GPIOs 232 (general-purpose input output), I 2 C interfaces 231, Local Bus 230 (for example, to connect a flash or EEPROM device used for system boot-up), hard disk 211 (for PVR support), Smart Card 216 (for conditional access) and SPI interfaces 233 (for internet connection).

Components of a Two-Channel System

The primary datapath within the SOC 210 takes as its input multiple scrambled, multiplexed, and compressed transport streams and produces uncompressed audio/video frames to drive one or more digital televisions and an analog television or VCR (video cassette recorder). This is illustrated in FIG. 3.

Figure 3:
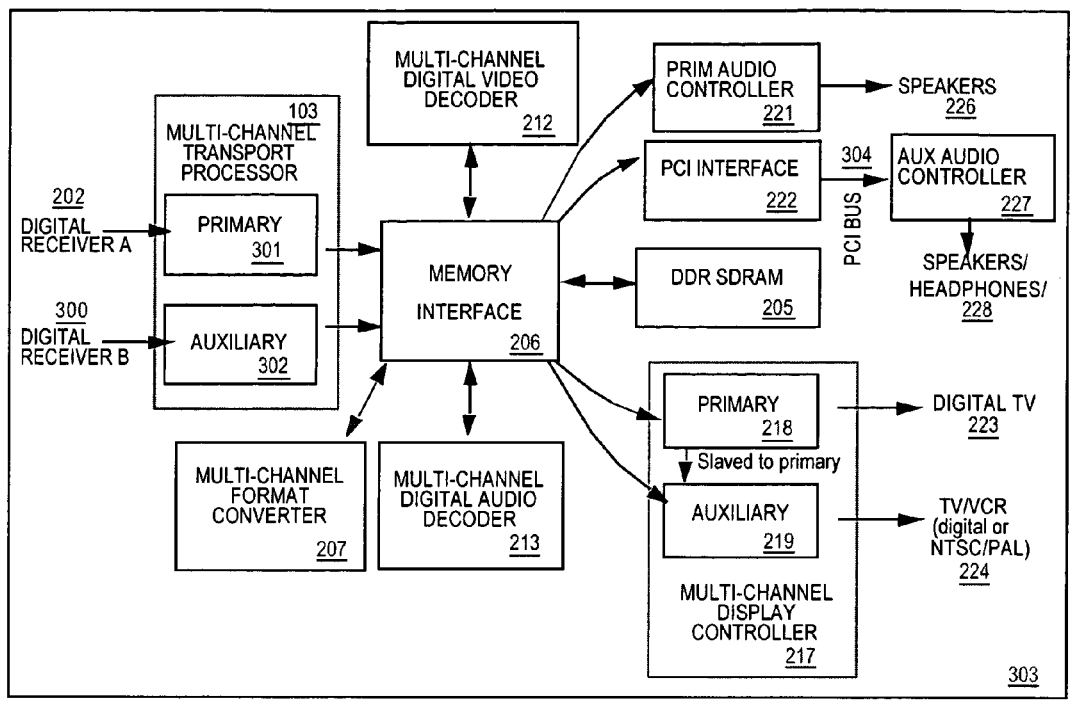
FIG. 3 is a flowchart of one embodiment of the flow of data in the present invention.

As shown in FIG. 3, the communication between the Transport Processor 103 and the Digital Decoders 212, 213 takes place through the Memory Interface 206 and DDR SDRAM 205. That is, while the Transport Processor 103 is demultiplexing the transport streams and writing out to several memory buffers (e.g., video streams, audio streams, Electronic Program Guide data, etc.), the Digital Video Decoder 212 gets its input from one of the video stream buffers in the Memory 205.

In one embodiment the Digital Video Decoder 212 has sufficient processing bandwidth, so that a single instantiation of the Digital Video Decoder 212 decompresses multiple video frames in a single frame time. Likewise, in one embodiment, the Digital Audio Decoder 213 decompresses audio data from one or more of the audio buffers in the Memory 205. In the case of AC-3 and most audio compression techniques, the Digital Audio Decoder 213 possesses sufficient processing bandwidth to decode two audio channels simultaneously.

The output of Digital Decoders 212, 213 are written into Memory 205 and subsequently read by the Display Controllers 218, 219 to generate the final video output(s) and the Audio Controllers 221, 227 to generate the final audio output(s) of the SOC 210.

Extension to an Arbitrary Number of Tuners

Support for an arbitrary number of tuners throughout the system is implemented with the following modifications. An independent VCXO is used to serve as the reference clock for channels coming from each tuner. An independent clock recovery circuit is used to keep track of the time base and compute the error in the external VCXO for each tuner. The present invention already contains support for two VCXO and the necessary clock recovery circuit. Furthermore the Transport Processor, in the present invention, can interface with up to eight digital tuners, and filter/descramble/demultiplex up to four transport streams. This may be logically extended to an arbitrary number of VCXOs and digital tuners.

Extension to an Arbitrary Number of Displays

The most efficient way to display additional channels is through the use of picture-in-picture and picture-and-picture. In one embodiment if additional displays are to be supported, only the output sections of the Display Controllers 218, 219 are duplicated and the remainder shared among the output channels. The output channels should be as simple as possible to avoid duplication of circuitry.

In one embodiment, a large fraction of formatting to the display is performed in the Multi-Channel Format Converter 207. Increasing the clock rate or further optimizing this unit is a low cost alternative to duplicating the logic for each channel to be displayed.

In one embodiment, for each display capable of displaying content from a different tuner the system includes a Display Controller channel to output the video data and to drive a display or VCR. The output section of the Display Controller channel is clocked by the VCXO associated with the tuner that captured the channel to be displayed. The cost of this channel can be minimized. When the same content is being output to multiple displays, some of the display channels may be slaved to other display channels to avoid additional circuitry necessary to fetch the same channel from memory twice. The support for multiple displays further may include additional Audio Controller channels to format and output the audio data for speakers, headphones, or recording. In one embodiment, the output section of the Audio Controller channel is clocked by the VCXO associated with the tuner that captured the channel to be output.

Extension to an Arbitrary Number of Channels

The need to handle additional channels is introduced either when additional tuners are added to the system or to support multiple channels per tuner. In digital multimedia streams, it is possible for the stream captured by a single tuner to contain multiple programs encoded by the same encoder. Multiple camera angles from a sporting event is an example of such a situation. Support for an arbitrary number of channels, in one embodiment, is implemented with the following modifications.

The Transport Processor 103 provides a sufficient number of input interfaces, and the capability to filter multiple streams, descramble them, and demultiplex them. The demultiplexed outputs for all these streams can be captured to an external memory. A high-performance microcontroller-based approach can efficiently handle demultiplexing functions on multiple transport streams. One embodiment of the present invention supports interfaces for eight independent digital tuners. One embodiment of the present invention supports PID filter functions, descrambling functions, and demultiplexing functions on four streams simultaneously. One embodiment of the present invention has clock recovery circuits to support two VCXOs. Support for more than two VCXOs can easily be achieved by instantiating additional instances of the clock recovery circuit. Additional clock recovery circuit results in significantly smaller overhead for supporting more than two channels, as compared to instantiating additional Transport Processors.

Additionally, the Digital Video 212 and Audio Decoders 213 must have sufficient bandwidth to support all channels. Since in one embodiment decoding need not be tightly coupled to the reference clock, independent decoders are not needed. The requirements for all channels can be met as long as sufficient processing bandwidth is available to decode compressed data for all channels within a single frame time. This can be accomplished, in one embodiment, by increasing the clock rate of the decoders 212, 213. Alternatively, the effectiveness of the decoders 212, 213 can be enhanced by optimizing the most expensive computations, for example by incrementally adding special instructions to the Digital Audio Decoder 213 DSP. This can in generally be accomplished at lower cost than simply replicating the units.

The Multi-Channel Format Converter 207 must provide sufficient processing bandwidth to meet the display conversion requirements for each channel. Since this is a shared resource, performance scaling is a more efficient approach than simply duplicating the circuitry for each channel.

The memory sub-system 205, 206 must provide sufficient overall bandwidth for all components of the system. The high-performance unified memory controller 205 provides a good basis for this work. In one embodiment, rather than duplicating the memory sub-system 205, 206 in its entirety, selected components that limit the system performance can be enhanced or duplicated. In one embodiment, the bandwidth can be increased by raising the clock rate to the memory subsystem 205, 206 and by using faster external memory 205. Alternatively, the memory interface 206 can be widened for higher throughput. The use of embedded DRAM (not shown) is one way to increase the throughput of the memory subsystem, and provide support for additional channels. These and other similar techniques may be used to support the bandwidth requirements of an arbitrary number of channels.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to receive multiple independently encoded input channels and provide at least one video output said method comprising:
   independently locking the at least one video output to one of the encoded input channels wherein independently locking the at least one video output includes:
      providing first and second independent voltage controlled oscillators configured to generate respective first and second reference clocks for outputting video data from the at least one video output;
      providing first and second independent clock recovery circuits each configured to receive clock information from any one of the encoded input channels and to independently control at least one of the first and second independent voltage controlled oscillators;
      enabling the first clock recovery circuit to independently recover a first clock information from a first encoded input channel, the first recovered clock information being provided to the first independent voltage controlled oscillator for generating the first reference clock;
      enabling a second clock recovery circuit to independently recover a second clock information from a second encoded input channel, the second recovered clock information being provided to the second independent voltage controlled oscillator for generating the second reference clock; and
      decoding video data from the first and second encoded input channels independent of the first and second recovered clock information using a single instance of a multi-channel video decoder, the multi-channel video decoder being configured to decode at least one frame of video data from both the first encoded input channel and the second encoded input channel during a time it takes to display a single frame of video data at the at least one video output; and
   outputting the decoded video data for at least one of the first and second encoded input channels from the at least one video output based on at least one of the first and second reference clocks.

2. The method of claim 1, further comprising:
   fine-tuning at least one of the first and second generated reference clocks based on a corresponding one of the first and second recovered clock information.

3. A method to receive a plurality of independently encoded transport streams and provide at least one video output, comprising:
   providing a plurality of sets of independent clock recovery circuits, each set of clock recovery circuits being configured to independently perform clock recovery to recover clock information from any one of the plurality of transport streams;
   locking one or more video outputs to one or more corresponding video input channels from the plurality of transport streams to keep each video output independently synchronized to the corresponding one of the video input channels;
   decoding video data from a plurality of video input channels from the plurality of transport streams independent of the first and second clock information using a single instance of a multi-channel video decoder; and
   outputting decoded video data to each of the one or more video outputs based on the clock recovery provided by at least one of the independent clock recovery circuits.

4. A system configured to receive a plurality of video input channels from independent transmitters comprising:
   a single instance of a multi-channel video decoder configured to decode at least one frame of video data from both a first video input channel and a second video input channel during a time it takes to display a single frame of decoded video data of one of the first and second video input channels;
   a first clock recovery circuit configured to independently recover a first clock information within the first video input channel the first recovered clock information used for rendering video data from the first video input channel;
   a second clock recovery circuit configured to independently recover a second clock information within the second video input channel, the second recovered clock information used for rendering video data from the second video input channel the second clock recovery circuit being further enabled to independently decode the first clock information within the first video input channel; and
   a video output that is configured for outputting the decoded video data from at least one of the first and second video input channels based on at least one of the first and the second recovered clock information,
   wherein the multi-channel video decoder is configured to decode the first and second video data from the first and second encoded input channels independent of the first and second recovered clock information.

5. The system of claim 4, further comprising:
   a single tuner configured to receive said plurality of video input channels and deconstruct the multiple channels into separate streams.

6. The system of claim 4, further comprising:
   multiple tuners, wherein each tuner is configured to receive one or more of said plurality of video input channels.

7. The system of claim 4, each of the first and second clock recovery circuits further comprising:
   a phase locked loop (PLL) configured to generate a reference clock for the video output based on an external voltage controlled oscillator (VCO).

8. The system of claim 4, further comprising:
   a multi-channel format converter to convert video frames to a display format, including one or more of the following: scaling, de-interlacing, color density correction.

9. A system designed to support multiple transport streams comprising:
   a single instance of a multi-channel video decoder configured to perform video decompression on video data of one or more channels output from each of the plurality of tuners independent of clock information from the one or more channels;
   a first clock recovery circuit configured to independently recover a first clock information within a first channel for rendering video data from the first channel; and
   a second clock recovery circuit configured to independently recover a second clock information within a second channel for rendering video data from the second channel independently of the video data from the first channel; and
   a video output that is configured to output the decompressed video data of at least one of the first and second channels based on at least one of the first and the second recovered clock information.

10. The system of claim 9, wherein the transport streams are compressed transport streams.

11. The system of claim 9, further comprising:
digital tuners configured to receive the transport streams.

12. The system of claim 9, further comprising:
a memory, wherein the multi-channel decoder is configured to read compressed data from the memory and to write back decompressed data to the memory.

13. The system of claim 9, wherein the multi-channel decoder is configured to perform decoding of six standard-definition frames in a time taken to display a single standard-definition frame.

14. The system of claim 9,
wherein the multi-channel format converter is configured to convert video frames of the first and second channels to a requested format, the multichannel format converter reading from a memory and writing formatted data back out to the memory.

15. The system of claim 14, wherein the multi-channel format converter handles one or more of the following conversions:
scaling, de-interlacing, and color density conversion.

16. The system of claim 4, further comprising a transport processor configured to control at least one voltage controlled oscillator of the first clock recovery circuit using a product of multiplying a proportionality constant by a difference between a System Time Clock value and a Program Clock Reference value.

17. The system of claim 9, further comprising a transport processor configured to control at least one voltage controlled oscillator of the first clock recovery circuit using a product of multiplying a proportionality constant by a difference between a System Time Clock value and a Program Clock Reference value.

* * * * *

UNITED STATES PATENT AND TRADEMARK OFFICE
CERTIFICATE OF CORRECTION

| | | |
|---|---|---|
| PATENT NO. | : 8,098,737 B1 | Page 1 of 1 |
| APPLICATION NO. | : 10/879819 | |
| DATED | : January 17, 2012 | |
| INVENTOR(S) | : Peter Trajmar et al. | |

It is certified that error appears in the above-identified patent and that said Letters Patent is hereby corrected as shown below:

Column 9, claim 1, line 3, insert --,-- after the word "output".

Signed and Sealed this
Seventeenth Day of April, 2012

David J. Kappos
*Director of the United States Patent and Trademark Office*